United States Patent [19]

Harvey

[11] Patent Number: 5,154,136

[45] Date of Patent: Oct. 13, 1992

[54] OUTDOOR FISH AQUARIUM

[76] Inventor: Robert E. Harvey, 133 Saxby Ter., Cherry Hill, N.J. 08003

[21] Appl. No.: 795,835

[22] Filed: Nov. 21, 1991

[51] Int. Cl.⁵ .............................................. A01K 63/00
[52] U.S. Cl. ..................................................... 119/5
[58] Field of Search ............. 119/3, 5; D30/101, 102, D30/103, 104, 105, 106, 107; 52/169.7; 4/488, 506; D25/2; 206/557

[56] References Cited

U.S. PATENT DOCUMENTS

| | | | |
|---|---|---|---|
| D. 244,621 | 6/1977 | Braid | D30/101 |
| D. 244,623 | 6/1977 | Braid | D30/101 |
| D. 258,990 | 4/1981 | Allard | D25/2 |
| D. 285,350 | 8/1986 | Sullivan | D25/2 |
| 1,393,339 | 10/1921 | Benton | 119/5 |
| 2,488,708 | 11/1949 | Clemetsen | 52/169.7 |
| 2,864,098 | 12/1958 | Lorimer | 52/169.7 |
| 4,008,547 | 2/1977 | Katzman | D25/2 X |
| 4,306,394 | 12/1981 | Blakeway | |
| 4,892,651 | 1/1990 | Hill | |
| 4,972,801 | 11/1990 | Hunt | |

OTHER PUBLICATIONS

Encon International Fiberglass Inc. Advertisement.
Encon Industries Catalog, 1980, Encon International Fiberglass, Inc., Harbor City, Calif.; 1 page-Group 280.

Primary Examiner—Gene Mancene
Assistant Examiner—Thomas Price
Attorney, Agent, or Firm—Richard C. Litman

[57] ABSTRACT

An outdoor fish aquarium has an upper and lower part, where the lower part is a cylindrical well where the fish would be safe from freezing weather. The aquarium is designed so that the water in the well would not all freeze in the coldest parts of the year, so that the fish could survive in the well when the rest of the water in the upper part is frozen.

12 Claims, 3 Drawing Sheets

OUTDOOR FISH AQUARIUM

BACKGROUND OF THE INVENTION

1. Field of the Invention

The present invention relates to outdoor fish aquariums.

2. Description of the Prior Art

Artificial ponds for aquatic life provide various features to provide a favorable man-made environment for the aquatic life placed in the pond.

U.S. Pat. No. 4,972,801 issued Nov. 27, 1990 to Robert D. Hunt discloses a pumping system for producing oxygen enriched water for aquatic life.

U.S. Pat. No. 4,892,651 issued on Jan. 9, 1990 to Theodore L. Hill discloses a filtering system for fish ponds.

U.S. Pat. No. 4,306,394 issued on Dec. 22, 1981 to Stanley R. Blakeway discloses swimming pools of various designs.

The Encon International Fiberglass article discloses various spas of different design made of fiberglass.

None of the prior art as cited above disclose varying the depth of an outdoor fish aquarium to prevent fish from freezing.

SUMMARY OF THE INVENTION

Accordingly, one object of the present invention is to provide a friendly environment for aquatic life by providing an outdoor fish aquarium made of non-toxic material such as fiberglass or plastic.

Another object of the present invention is to provide a variable depth outdoor fish aquarium for preventing all the water in the aquarium from freezing.

Another object of the present invention is to provide an outdoor aquarium of various shapes.

These and other objects of the present invention will become readily apparent upon further review of the following specification and drawings.

The present invention provides for outdoor fish aquariums of various shapes for appealing to the various tastes of consumers. All of the various designs prevent the water from freezing all the way to the bottom of the aquarium by providing variable depths in which water at the lower levels of the aquarium will not freeze in most cases and the water in the lowest level of the aquarium would not freeze during the coldest parts of the year. This is done by designing the aquarium for a certain region using readily available statistics from that region, such as the normal coldest temperature and the freezing line depth for the ground.

DETAILED DESCRIPTION OF THE PRESENT INVENTION

Figure 1:
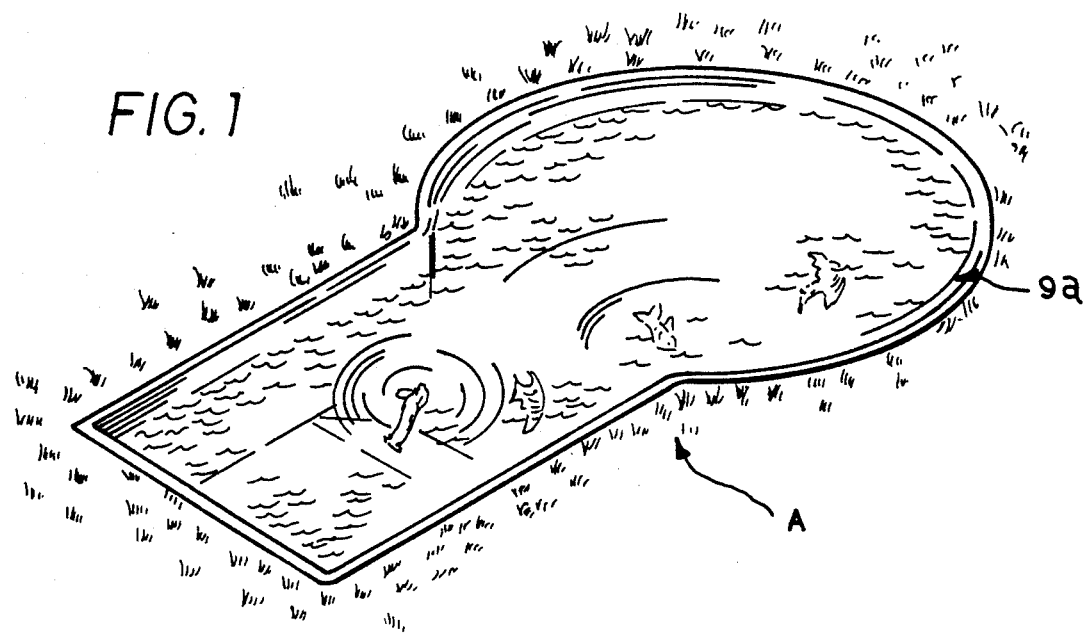
FIG. 1 is a perspective view of a first embodiment.
Figure 2:
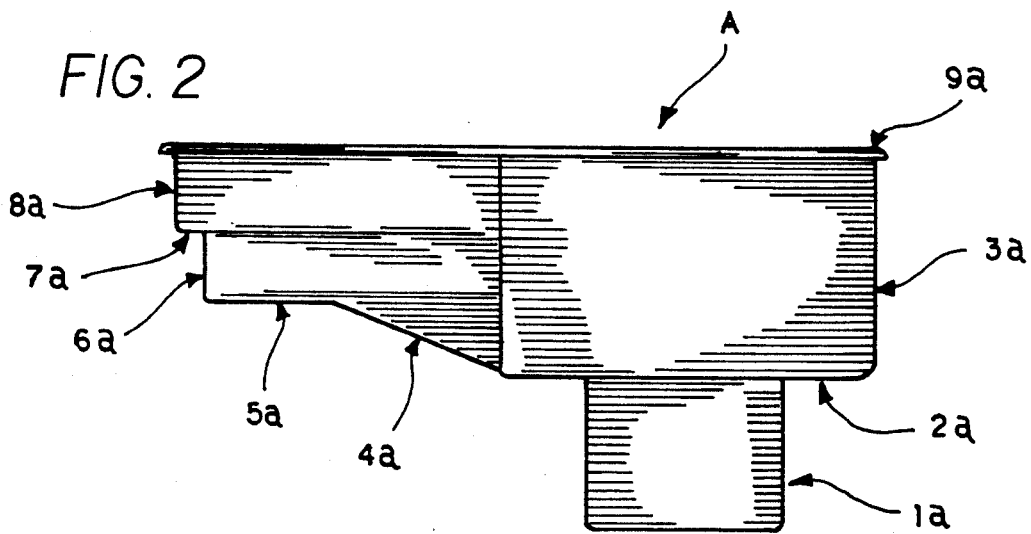
FIG. 2 is a side elevational view of the first embodiment.
Figure 3:
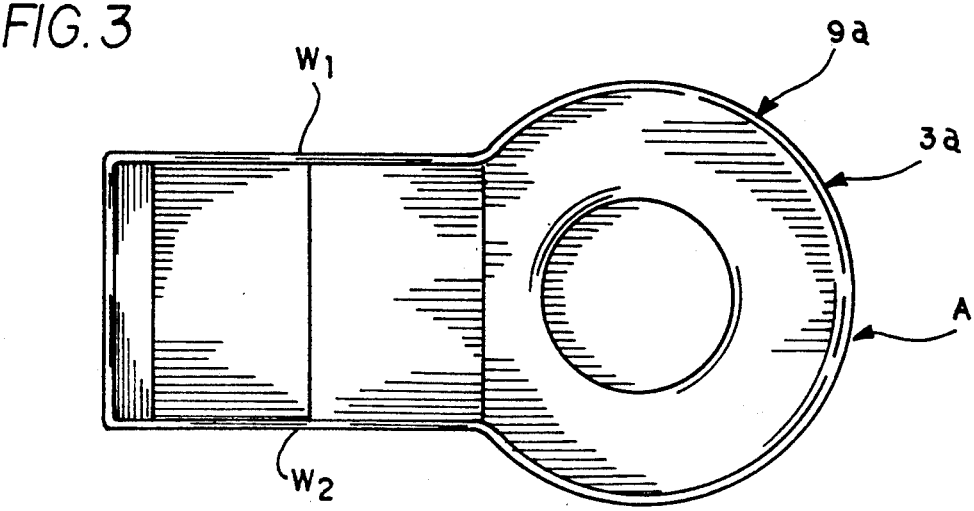
FIG. 3 is a top view of the first embodiment.

In the first embodiment as seen in FIG. 1 an outdoor fish aquarium, herein referred to as Aqua Fish Garden A or simply unit A, is shown as it is designed to be used. The Aqua Fish Garden A is placed in the ground by excavating the ground and placing the unit A in the ground. As shown in FIG. 2, the unit A comes as one piece preferably made from molded fiberglass. The unit A could be made from molded plastic or the like instead. As shown in FIG. 1, once Aqua Fish Garden A is placed in the ground, the open-ended top most portion forms a rim 9a designed to be at ground level once unit A is placed into the ground.

As shown in FIG. 2, Aqua Fish Garden A has a lower part 1a which is designed to be at a depth lower than or equal to the depth of the freeze line for the geographical region for which the unit A is designed. The lower part 1a is a cylindrical well with preferably a greater depth than cross-sectional diameter. One of the advantages of the present invention is that even in the coldest parts of the year, the water in the lower part 1a will not all freeze. If the upper part of the unit A freezes, then the fish, preferably cold-blooded fish such as goldfish, can still survive in the lower part 1a. The metabolism of cold-blooded fish slows down such that in colder climates the fish need less food and oxygen from the water. Therefore, the fish can survive in a more confined area at close to freezing temperatures than they could in warmer climates. The lower part 1a is prevented from freezing by placing the well below the freeze line of the ground so that the warmth from the ground can warm the water in the lower part 1a. Even during cold weather, the ground at lower depths maintains a certain temperature. Therefore, the ground around the cylindrical well warms the water in that well. Since the diameter of the cylindrical well is less than its length, the surface area of warmer ground around the cylinder per unit volume of water is greater than it would be if the length of the cylinder well was less than its diameter. This prevents the water in the well from freezing all up during the coldest parts of the year for the geographical region for unit A is intended to be used.

For example, in the Washington Metropolitan Area the depth of the freeze line in the ground is about eight inches (8″). If the Aqua Fish Garden A were to be designed for this geographical region, then the distance from rim 9a to level surface 2a where the top end of the cylinder of lower part 1a begins would be at least eight inches (8″).

Unit A consists of multiple levels where the horizontal cross sectional area of the unit decreases from top to bottom. More specifically, Unit A has a first drop portion 8a having a first vertical surface leading to a first level portion 7a. Level portion 7a is connected to a second level portion 5a after a straight drop by second drop portion 6a. A third drop portion 4a having a second bevelled surface starts from the end of level portion 5a and leads to a third level portion 2a. Level portion 2a is circular except for the edge of the bottom side of the second drop portion. The first drop portion 8a, first level portion 7a, second drop portion 6a, second level portion 5a, and third drop portion 4a are all rectangularly shaped and are bounded by a first wall W1 on one side and a second wall W2 on the other side. Both walls end along a vertical plane passing through the edge of the bottom side of the third drop portion where a cylindrically shaped third wall 3a starts at the end of first wall W1 and extends away from the second wall W2 to circularly connect to the end of the second wall W2. The top open end of the lower part is formed into the center of the third level portion 2a.

In the example given above for the Washington Metropolitan Area, the preferred depth of the top open portion of the lower part 1a is eighteen inches (18") and the preferred length of the cylinder of the lower part 1a is twenty-four inches (24"). The preferred diameter of the cylinder of the lower part 1a is eighteen inches (18"). Further, the first level portion 7a is eight inches (8") deep and the second level portion 5a is twelve inches (12") deep. The first drop portion 8a drops eight inches (8"). The second drop portion drops four inches (4"). The diameter of the third wall 3a not intersecting the bottom side of the second slanted surface of the third drop portion 4a is four feet and six inches (4'6"). The total span of Aqua Fish Garden A is eight feet (8').

Figure 4:
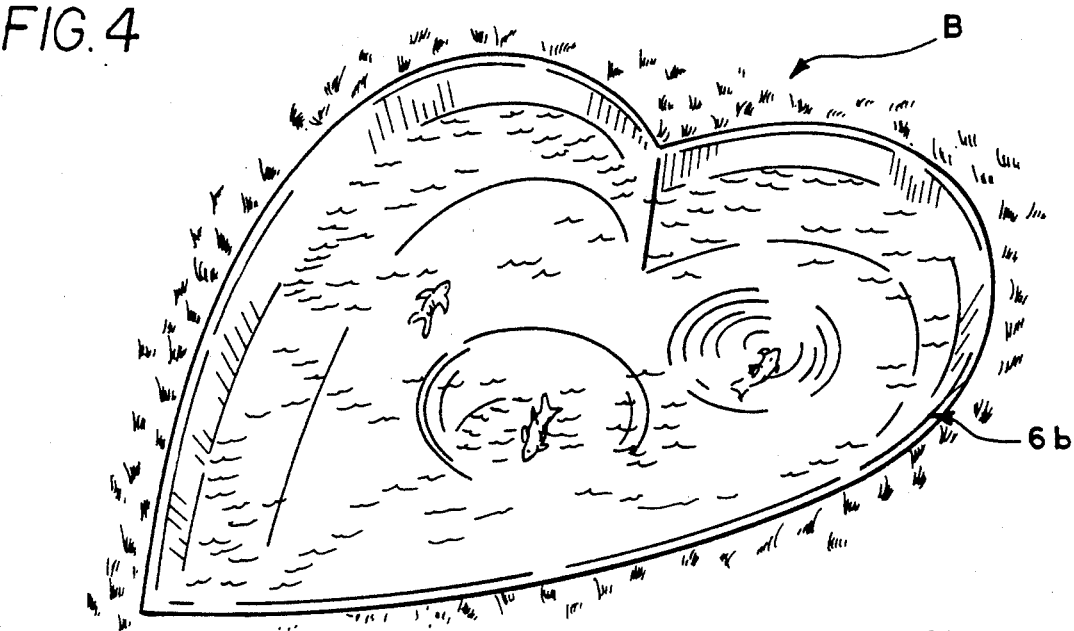
FIG. 4 is a perspective view of a second embodiment.
Figure 5:
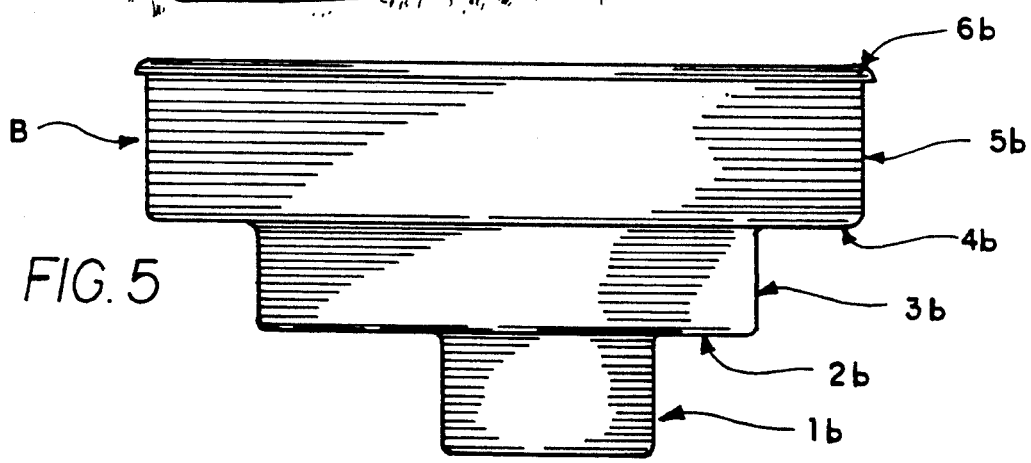
FIG. 5 is a side elevational view of the second.
Figure 6:
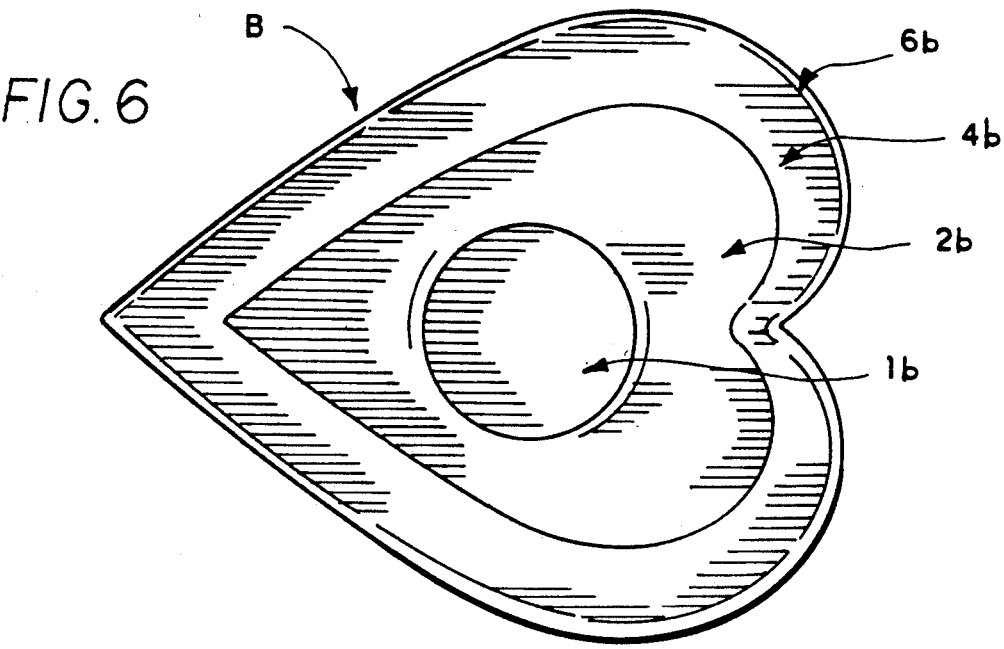
FIG. 6 is a top view of the second embodiment.

In a second embodiment of the present invention a heart shaped outdoor fish aquarium, herein referred to as Aqua Fish Garden B or unit B, is shown in FIG. 4 placed in the ground with an open-ended top most portion having a rim 6b located at ground level. As shown in FIG. 5 and FIG. 6, unit B has a lower part 1b which is designed to be at a depth lower than or equal to the depth of the freeze line for the geographical region for which the unit B is designed. The lower part 1b is a cylindrical well formed at the bottom end of the upper part of unit B. The advantages of such a design are the same as for the design of lower part 1a of unit A as discussed above.

As shown in FIG. 5 and FIG. 6, Agua Fish Garden B has an open-ended top most portion having a heart shaped rim 6b. A first drop portion 5b has a heart shaped top end, formed by rim 6b, and a heart shaped bottom end. The first drop portion 5b has a vertical surface extending from its heart shaped top end to its heart shaped bottom end. A first level portion 4b is heart shaped with its outer boundary formed at the heart shaped bottom end. The first level portion 4b has an inner cutout also heart shaped and centered within the heart shaped outer boundary. The inner cutout forms the top of a second drop portion 3b. The bottom end of the second drop portion 3b is also heart shaped and a vertical surface extends from the top end and bottom end of the second drop portion 3b. At the bottom end of the second drop portion, a second level portion 2b bounded by the bottom end forms a heart shaped level surface at the bottom of the upper part of the Aqua Fish Garden B, where the top end of the lower part 1b is formed as discussed above.

An example for the exact dimensions in a geographic region with a freeze line depth of eight inches (8") below the ground would include placing the lower part 1b at least eight inches (8") below the rim 6b. In the preferred embodiment, second level portion is twelve inches deep, i.e. twelve inches (12") below the rim 6b. The first level portion is eight (8") deep. The cylinder of the lower portion 1b is thirty inches long (30") with a diameter of eighteen inches (18"). Therefore, the depth at the bottom of the cylinder of the lower part 1b is forty-two inches (42"). The length and width of the heart would be eight feet (8') each.

Figure 7:
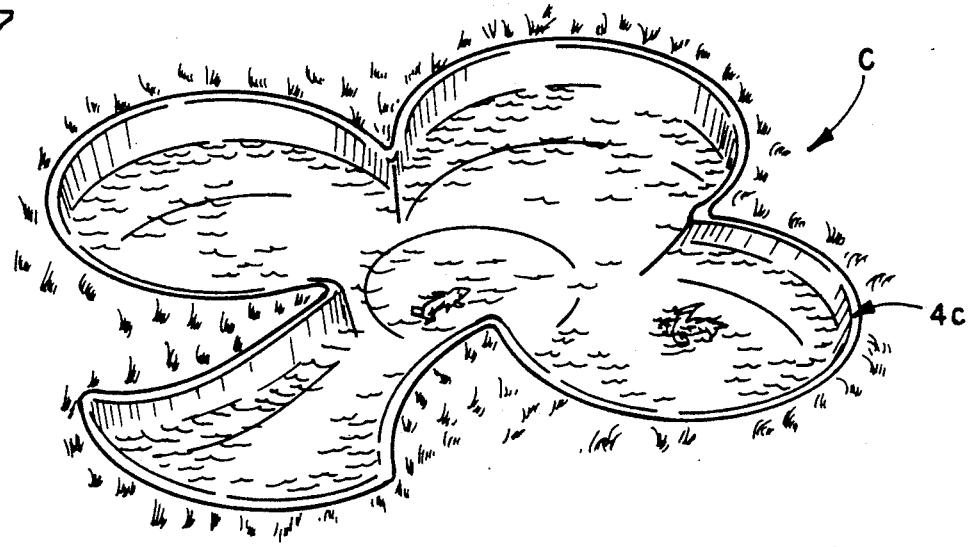
FIG. 7 is a perspective view of a third embodiment.

In a third embodiment as shown in FIG. 7, a clover shaped outdoor fish aquarium, herein referred to as Aqua Fish Garden C or unit C, is designed to be place in the ground as described above for units A and B. An open-ended top most portion has a rim 4c at ground level.

Figure 8:
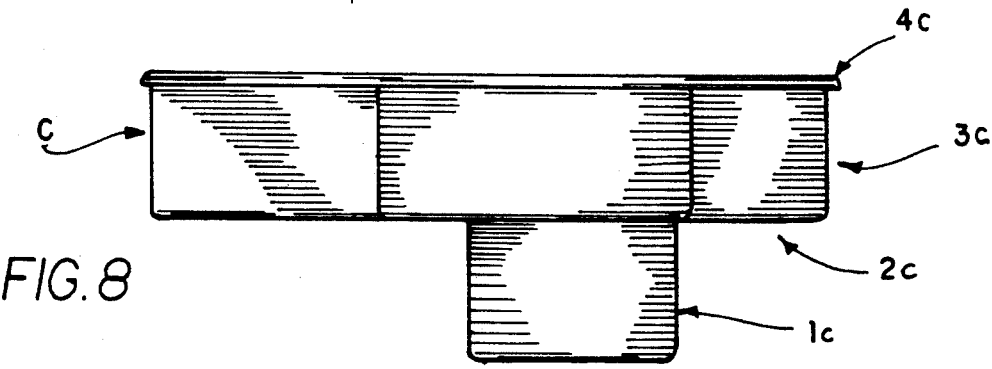
FIG. 8 is a side elevational view of the third embodiment.
Figure 9:
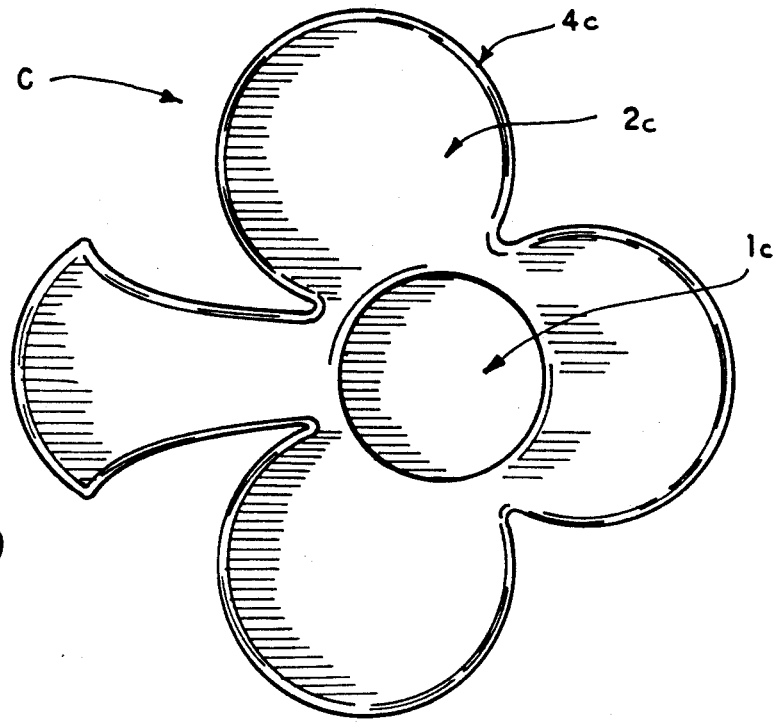
FIG. 9 is a top view of the third embodiment.

As shown in FIG. 8 and FIG. 9, the lower part 1c is a cylindrically shaped well to allow the fish to survive in freezing weather as described above for units A and B. A drop portion of the unit C is formed by a vertical surface 3c extending twelve inches (12") down from the rim 4c in the example for a region of a freeze line of eight inches (8"). A level portion 2c is bounded by the bottom end of the drop portion. The lower part 1c has a length of thirty inches (30") and a diameter of eighteen inches (18"). The bottom of the well is again forty-two inches (42"). The total length of the unit C is eight feet (8').

It is to be understood that the present invention is not limited to the embodiments described above, but encompasses any and all embodiments with the scope of the following claims.

I claim:

1. An outdoor fish aquarium designed to be placed into an excavated ground region in a geographical region having a known ground freezing line depth for which said outdoor fish aquarium is designed to be used, comprising;
   an upper part for holding water comprising an open-ended top most portion and a bottom portion, said open-ended top most portion designed to be at ground level when said aquarium is placed into said excavated ground region; and,
   a lower part for holding water wherein said lower part comprises a cylindrical vertical surface comprising a top open circular end at said bottom portion of said upper part and a bottom end comprising a bottom level circular surface, wherein said top open circular end is located at or below said known ground freezing line depth when said outdoor fish aquarium is placed into said excavated ground region with said open-ended top most portion at ground level.

2. The outdoor fish aquarium as claimed in claim 1, wherein said upper part further comprises;
   a first drop portion comprising a first heart shaped top end and a first heart shaped bottom end and a surface between said first heart shaped top end and said first heart shaped bottom end, wherein said first heart shaped top end forms said open-ended top most portion;
   a first level portion comprising a heart shaped first level surface having a first outer boundary of said first level surface defined by said first heart shaped bottom end and an inner heart shaped cutout;
   a second drop portion comprising a second heart shaped top end and a second heart shaped bottom end and a vertical surface between said second heart shaped top end and said second heart shaped bottom end, wherein said second heart shaped top end is bounded by said first inner heart shaped cutout; and
   a second level portion comprising a heart shaped second level surface and bounded by said second heart shaped bottom end, wherein said heart shaped second level surface forms said bottom portion of said upper part of said outdoor fish aquarium.

3. The outdoor fish aquarium as claimed in claim 1, wherein said upper part and said lower part are formed of molded fiberglass.

4. The outdoor fish aquarium as claimed in claim 1, wherein said upper part and said lower part are formed of molded plastic.

5. The outdoor fish aquarium as claimed in claim 2, wherein said upper part and said lower part are formed of molded fiberglass.

6. The outdoor fish aquarium as claimed in claim 2, wherein said upper part and said lower part are formed of molded plastic.

7. An outdoor fish aquarium designed to be placed into an excavated ground region in a geographical region have a known ground freezing line depth for which said outdoor fish aquarium is designed to be used, comprising;

a first vertical wall having a top side;

a second vertical wall having a top side;

a first drop portion having a rectangularly shaped first vertical surface, wherein said first vertical surface has a top side with one end thereof attached to the top side of said first vertical wall and another opposite end thereof attached to the top side of said second vertical wall;

a first side of said first vertical surface adjacent with the top side of said first vertical surface and connected to said first vertical wall;

a second side of said first vertical surface opposite said first side of said first vertical surface and connected to said second vertical wall;

a bottom side of said first vertical surface opposite said top side of said first vertical surface;

a first level portion having a rectangularly shaped first level surface with a first side of said first level surface connected to said first vertical wall;

a second side of said first level surface opposite said first side of said first level surface which is connected to said second vertical wall;

a third side of said first level surface between said first and said second sides of said first level surface which is connected to the bottom side of said first vertical surface;

a fourth side of said first level surface opposite said third side of said first level surface;

a second drop portion having a rectangularly shaped second vertical surface with a first side of said second vertical surface connected to said first vertical wall;

a second side of said second vertical surface connected to said second vertical wall;

a top side of said second vertical surface connected to said fourth side of said first level surface;

a bottom side of said second vertical surface opposite said top side of said second vertical surface;

a second level portion having a rectangularly shaped second level surface with a first side of said second level surface connected to said first vertical wall;

a second side of said second level surface connected to said second wall;

a third side of said second level surface connected to with said bottom side of said second vertical surface;

a fourth side of said second level surface opposite said third side of said second level surface;

a third drop portion having a rectangularly shaped bevelled surface with a first side of said bevelled surface connected to said first vertical wall;

a second side of said bevelled surface connected to said second vertical wall;

a top side of said bevelled surface connected to said fourth side of said second level surface;

a bottom side of said bevelled surface opposite said top side of said second vertical surface, wherein said first vertical wall has a vertical side which extends from the top side of said first vertical wall down to one end of the bottom side of said bevelled surface and said second vertical wall has a vertical side which extends from the top end of said second vertical wall down to another end of the bottom side of said bevelled surface which is opposite the one end of the bottom side of said second vertical surface;

a cylindrically shaped third wall having a top side and a bottom side;

a first vertical side of said cylindrically shaped third wall connected to the vertical side of said first vertical wall;

a second vertical side of said cylindrically shaped third wall connected to the vertical side of said second vertical wall;

a third level portion comprising a third level surface in contact with said bottom side of said second bevelled surface and said bottom side of said cylindrically shaped third wall;

a lower part for holding water wherein said lower part comprises a cylindrical vertical surface, a top circular open end in contact with said third level portion, and a bottom circular closed end having a bottom level circular surface, wherein said top circular open end is located at or below said known ground freezing line depth when said outdoor fish aquarium is placed into said excavated ground region with the top ends of said first vertical wall, said second vertical wall, said first drop portion, and said cylindrically shaped third wall at ground level, wherein said cylindrically shaped third wall has a cylindrically shaped vertical surface extending from the first vertial side thereof to the second vertical side thereof.

8. The outdoor fish aquarium as claimed in claim 7, wherein said upper part and said lower part are formed of molded fiberglass.

9. The outdoor fish aquarium as claimed in claim 7, wherein said upper part and said lower part are formed of molded plastic.

10. The outdoor fish aquarium as claimed in claim 6, wherein said upper part and said lower part are formed of molded fiberglass.

11. The outdoor fish aquarium as claimed in claim 6, wherein said upper part and said lower part are formed of molded plastic.

12. An outdoor fish aquarium designed to be placed into an excavated ground region in a geographical region having a known ground freezing line depth for which said outdoor fish aquarium is designed to be used, comprising;

a drop portion comprising a clover shaped top end, a clover shaped bottom end, and a vertical surface between said clover shaped top end and said clover shaped bottom end, in which said clover shaped top end is designed to be at ground level when said aquarium is placed into said excavated ground region;

a level portion comprising a clover shaped surface bounded by said clover shaped bottom end;

a lower part for holding water wherein said lower part comprises a cylindrical vertical surface, a top circular open end in contact with said clover shaped surface, and a bottom circular closed end having a bottom level circular surface, wherein said top circular open end is located at or below said known ground freezing line depth when said outdoor fish aquarium is placed into said excavated ground region with said open-ended top most portion at ground level.

* * * * *